Figure 1:
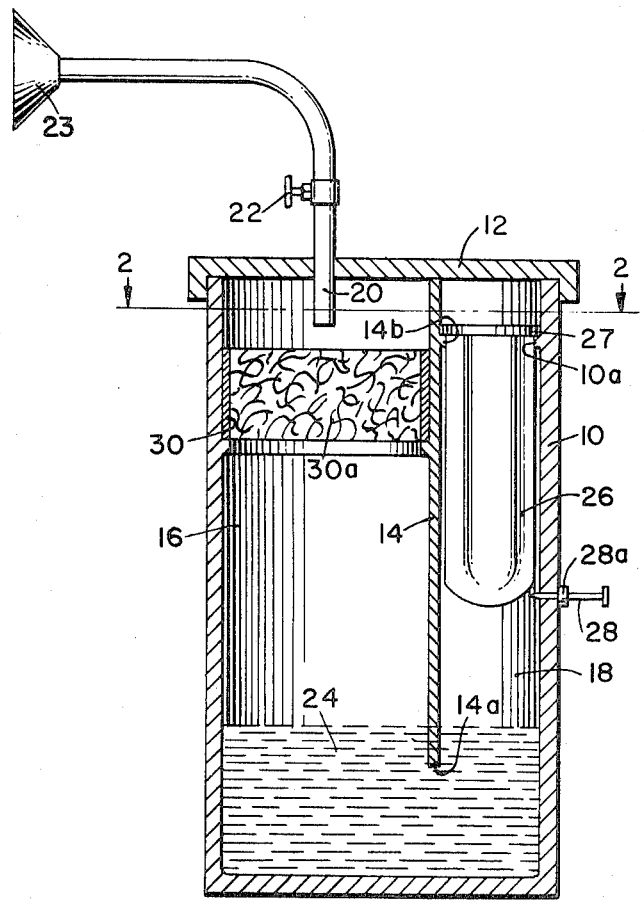

United States Patent

[11] 3,615,252

| [72] | Inventor | Anita J. DiPietro |
| | | P.O. Box 295, Alma, Mich. 48801 |
| [21] | Appl. No. | 815,765 |
| [22] | Filed | Apr. 14, 1969 |
| [45] | Patented | Oct. 26, 1971 |

[54] OXYGEN-GENERATING DEVICE
11 Claims, 2 Drawing Figs.

[52] U.S. Cl. .................................................... 23/282, 23/221, 23/281
[51] Int. Cl. .................................................... B01j 7/02, B01j 7/00, C01b 13/02
[50] Field of Search .......................................... 23/281, 282, 221

[56] References Cited
UNITED STATES PATENTS

| 181,268 | 8/1876 | Kayser | 23/282 |
| 1,419,653 | 6/1922 | Van Meter | 23/282 |
| 1,462,705 | 7/1923 | Kirby et al. | 23/282 |
| 2,409,166 | 10/1946 | Tracey et al. | 23/282 X |
| 2,444,029 | 6/1948 | Bowen | 23/221 X |
| 3,246,959 | 4/1966 | Brewer | 23/282 |
| 3,276,846 | 10/1966 | Moni et al. | 23/281 |
| 3,480,403 | 11/1969 | Hovey | 23/282 |

*Primary Examiner*—Morris O. Wolk
*Assistant Examiner*—D. G. Conlin
*Attorney*—Learman, Learman & McCulloch ABSTRACT: An oxygen-generating device comprising a canister which has oxygen-generating material for reacting with a reacting agent, preferably water, which is placed in a closed pierceable container also disposed in the canister. Means for releasing the reacting agent, preferably a needle, is mounted in the canister for piercing the container to release the reacting agent to the oxygen-generating material. A filter is included to filter the impurities from the oxygen gas before it passes through valved outlet means.

PATENTED OCT 26 1971

3,615,252

INVENTOR
ANITA J. DI PIETRO

BY Learman, Learman & McCulloch

OXYGEN-GENERATING DEVICE

The invention relates to oxygen-generating devices and more particularly to the in situ generation of oxygen in closed, readily portable containers. A source of oxygen is often needed in remote areas where external power is not available, such as bomb shelters, remote mountainous areas, and various watercraft. In other areas where a source of oxygen is available, but is not immediately available, persons suffering from heart ailments and other afflictions frequently require an immediate and direct source of oxygen which may be hand-carried. Thus, there is a need for a small oxygen gas generator of uncomplicated construction which can be simply and quickly operated by unskilled persons to rapidly administer the required gas. Prior art devices have been complex, heavy, and difficult to operate.

Another requirement imposed upon oxygen generators of this type is that the device must have a long shelf life and remain inactive until the need for oxygen gas arises. If the gas is generated and stored for a long period, a problem of storage and adequate sealing of the gas results in bulky and heavy cylinders which cannot be readily hand-carried.

Inexpensive oxygen generators of the present type can be well utilized in automobiles, boats, airplanes and camping and other vehicles. Because the gas generated will include impurities, a filter means will be required for filtering impurities from the oxygen gas generated.

Accordingly, it is an object of the present invention to provide an oxygen generator which is reliable and yet simple to operate.

Another object of the present invention is to provide an oxygen generator which remains inactive, but which may be quickly and simply activated when needed.

Still another object of the present invention is to provide an oxygen generator which can control the flow of oxygen therefrom.

Yet another object of the present invention is to provide an oxygen generator which has a filter for removing impurities from the oxygen gas.

Briefly, in accordance with the prevent invention, there is provided an oxygen generator comprising a canister having a valve mounted in one end for controlling the outflow of oxygen. Provided in the canister are an oxygen-generating material and a reacting agent for reacting with the oxygen-generating material. Until the time when oxygen gas is desired, the reacting agent is stored in a separate container within the canister. Means for releasing the reacting agent by piercing the container are mounted in the container. A filter, preferably glass wool, may be provided in the path of the outflowing stream of oxygen gas to remove impurities therefrom.

Figure 2:
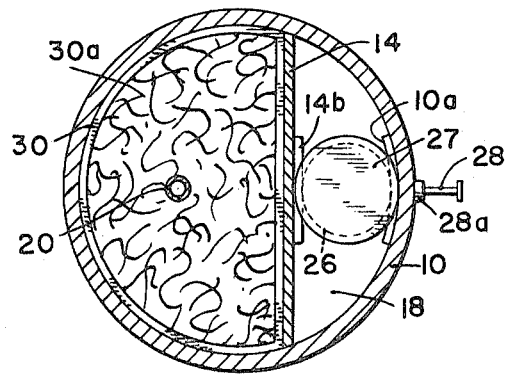

Other objects and advantages of the present invention will become apparent to one of ordinary skill in the art upon a reading of the following description when considered in relation to the accompanying drawing, in which:

FIG. 1 is a side elevational view, in section, of an oxygen generator constructed according to the invention; and FIG. 2 is a cross-sectional plan view of the oxygen generator, taken along the line 2—2 of FIG. 1.

Referring now to the drawing, a hollow metal or plastic canister 10 is shown as having its upper opening sealed by means of a cover 12 which is preferably releasably secured in position. Depending from cover 12 is a partition wall 14 having an opening 14a therein, preferably at the bottom of canister 10, as shown. Wall 14 may be rigidly connected with the sidewalls of canister 10, as shown, or depend solely from cover 12. The depending wall 14 is effective to divide canister 10 into first and second compartments 16 and 18, respectively, with opening 14a being effective to provide communication therebetween.

Mounted in the cover 12 is a conduit 20 which extends upwardly from the top of the canister and is in communicating relation with compartment 16. As will be described more fully hereinafter, conduit 20 functions to convey the oxygen gas which is generated in the canister. Preferably a conventional jet valve 22 is provided in conduit 20 for selectively controlling the flow of gas through the conduit. Also, a mask 23 or other device suitable for patient use may be connected to the opposite end of conduit 22.

Oxygen-generating material 24, preferably of peroxide composition, is placed in the bottom end of canister 10, as shown. The oxygen-generating material may be in either solid or liquid form, and preferably may be sodium peroxide in powder or granular form.

Located in the second compartment 18 is a container 26 formed from penetrable material, preferably a polyethylene plastic film or the like. As shown in FIG. 2 of the drawing, the container 26 has a rigid top 27 for supporting the container 26 or protuberances 14b and 10a formed on the wall 14 and the sidewall of the canister 10, respectively. These protuberances serve as a supporting ledge for the container 26. Enclosed within container 26 is a reacting agent, preferably water, for reacting with the oxygen-generating material 24 to produce the oxygen gas.

The means for releasing the reacting agent from container 26 includes a needle 28 slidably mounted in a slide bearing or valve 28a on the wall of canister 10. Movement of the needle 28 inward from the position shown in the drawing, pierces the lower portion of container 26, thereby releasing the reacting agent contained therein. The needle 26 may be supported in any other convenient location.

The reacting agent, when released, immediately contacts the oxygen generating material 24 to generate oxygen. Sodium peroxide or other equivalent of oxygen-generating substances may be used as the material 24. If the reacting agent is water and the oxygen-generating material 24 is sodium peroxide, the generation of oxygen will be in accordance with the formula:

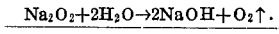

$$Na_2O_2 + 2H_2O \rightarrow 2NaOH + O_2 \uparrow.$$

The oxygen gas thus generated will increase the pressure within container 10 and the oxygen gas will flow through the first compartment 16 to conduit 20 when the normally closed valve 22 is opened. Before passing through conduit 20, however, the oxygen gas passes through a filter cage 30, having a glass wool filtering element 30a, for removing impurities from the oxygen gas. The filter 30 may be supported by partition wall 14 and is located in the outflow compartment 16 immediately below conduit 20.

The operation of the oxygen generator, according to the invention, is initiated by pushing the needle 28 inwardly. When the needle 28 pierces the film container 26, the reacting agent is released and flows to the bottom of the container where it mixes with the oxygen-generating material 24. Oxygen gas is released and flows through the impurity removing filter 30 to the outflow conduit 20, and thence through the face mask 23 to a heat attack victim or the like. As noted, valve 22 can be regulated to control the flow of oxygen gas which is under a pressure in canister 10 of approximately 2 p.s.i.

Since it is obvious that many changes and modifications can be made in the above-described details without departing from the nature and spirit of the invention, it is to be understood that the invention is not limited to said details, and is rather set forth in the appended claims.

What I claim is:

1. An oxygen generator for generating oxygen gas comprising:
   a canister having first and second ends and a partition wall dividing said canister into first and second compartments;
   a conduit in said first end of said canister and communicating with said first compartment for carrying away oxygen gas;
   a valve in said conduit for selectively controlling the flow of said oxygen gas;
   a film container containing water supported by said wall and located in said second compartment;
   a needle slidably mounted in said canister for piercing said container to release said water;

a peroxide substance adjacent said other end of said container for reacting with said released water to generate said oxygen gas;

and a layer of glass wool supported by said wall in said first compartment for removing impurities from said oxygen gas before it passes through said conduit.

2. An oxygen generator for generating oxygen comprising:

a canister having top and bottom ends and a partition wall dividing the upper portion of said canister into first and second side by side chambers and terminating in spaced relation with said bottom end;

oxygen-generating material in the bottom end of said canister in both chambers for accomplishing the generation of oxygen gas, when activated;

outlet control valve means in communication with said first chamber for controlling the release of oxygen gas;

container means including a flexible, pierceable film wall supported by said partition wall for containing an activating agent in said second chamber; and needle means movably mounted on said canister for movement from a removed position to a position piercing the film wall for piercing said film wall and releasing said agent to react with the generating material and produce a flow of oxygen gas.

3. An oxygen generator as set forth in claim 2 including:

filter means mounted in said canister adjacent said outlet valve for filtering impurities from said oxygen gas.

4. An oxygen generator as set forth in claim 3 wherein said filter means comprises a layer of glass wool.

5. An oxygen generator as set forth in claim 2 wherein said reacting agent is water.

6. An oxygen generator as set forth in claim 3 wherein said oxygen-generating material is peroxide.

7. An oxygen generator as set forth in claim 6 wherein said peroxide is sodium peroxide.

8. The oxygen generator as set forth in claim 2 wherein said outlet control valve means is connected to said top end of said canister.

9. The oxygen generator as set forth in claim 8 wherein said film means comprises a synthetic plastic bag.

10. The oxygen generator set forth in claim 9 including a support ledge in said second chamber, and a rigid support member forming a top for said pierceable plastic film bag supported by said ledge.

11. A readily portable oxygen generator for the in situ generation of oxygen gas comprising:

a canister having outlet control valve means for releasing oxygen gas;

an oxygen-generating material for the generation of oxygen in said canister when activated;

container means including a flexible film wall, containing a reacting agent proximate said oxygen-generating material but held out of contact therewith; and needle means movably mounted on said canister for piercing said plastic film wall and releasing said agent to react with the generating material and produce a flow of oxygen gas.